United States Patent Office 3,442,940
Patented May 6, 1969

3,442,940
1-CARBOXYL - 4 - AMINO- (OR 1 - CARBOXYL-4-N-ALKYLAMINO-) CYCLOHEXENES AND PROCESS FOR THE PREPARATION THEREOF
Goro Inoue and Noboru Ohshima, Tokyo, Japan, assignors to Asahi Kasei Kogyo Kabushiki Kaisha, Kita-ku, Osaka, Japan, a corporation of Japan
No Drawing. Filed Sept. 10, 1965, Ser. No. 486,557
Claims priority, application Japan, Sept. 11, 1964, 39/51,391
Int. Cl. C07c 101/12, 99/10, 101/02
U.S. Cl. 260—514
10 Claims

ABSTRACT OF THE DISCLOSURE

Novel compounds of the formula:

R—NH—⌬—COOH wherein R is hydrogen or an alkyl group having up to 20 carbon atoms, and a process for the preparation thereof which comprises treating a 4-halo-4-cyanocyclohexene with ammonia or a primary alkyl amine of 1 to 20 carbon atoms and then with an inorganic acid to effect hydrolysis.

---

This invention relates to novel chemical compounds and a process for the preparation thereof.

It has been found that novel compounds: 1-carboxyl-4-amino-cyclohexenes having the structure represented by the formula:

H₂N—⌬—COOH or N-alkyl substituted derivatives thereof, that is 1-carboxyl-4-N-alkylamino-cyclohexenes can be obtained easily and in high yield according to a process in which a 4-halo-4-cyano-cyclohexene is treated with ammonia or a primary alkyl amine (which amine may be mixed with a tertiary amine) and is then treated with an inorganic acid to effect hydrolysis.

The above process can be summarized by the following reaction scheme:

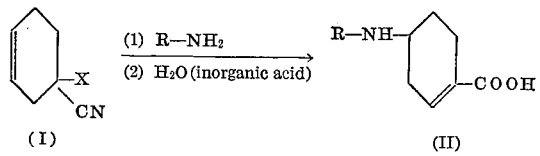

wherein X is Cl or Br, and R is hydrogen or an alkyl group having not more than 20 carbon atoms.

The novel Compounds II include the following:

| Compounds | Molecular weight | Melting point (° C.) |
|---|---|---|
| H₂N—⌬—COOH(2H₂O) 1-carboxyl-4-amino-cyclohexene(hydrate) | 177 | 241–242 |
| CH₃—NH—⌬—COOH 1-carboxyl-4-N-methylamino-cyclohexene | 155 | 229–230 |
| C₂H₅—NH—⌬—COOH 1-carboxyl-4-N-ethylamino-cyclohexene | 169 | 217–218 |
| (CH₃)₂CH—NH—⌬—COOH 1-carboxyl-4-N-isopropylamino-cyclohexene | 183 | 224–225 |
| CH₃(CH₂)₃NH—⌬—COOH 1-carboxyl-4-N-butylamino-cyclohexene | 197 | 208–209 |

These novel compounds have been found useful as starting materials for various organic syntheses and as starting materials for the preparation of high molecular weight substances. In particular, the present compounds can be copolymerized with various ω-amino-carboxylic acids or lactams to form polyamides containing cyclohexene rings in the main chain, and moreover the copolymers can be crosslinked at the double bonds to give stiff polymers which can be used in the preparation of synthetic leather. The double bonds of the present compounds can be hydrogenated very easily to give the corresponding cyclohexene derivatives, and moreover after lactamization they can be polymerized to give heat resistant polyamides.

The process according to which the present compounds are obtained will be explained more in greater detail below.

The starting material, 4-halo-4-cyanocyclohexene is the addition compound of an α-haloacrylonitrile and butadiene and can be easily obtained by the reaction between these compounds under well known conditions.

The ammonia to be reacted with said 4-halo-4-cyano-cyclohexene may be introduced in any form such as liquid ammonia or aqueous ammonia, though liquid ammonia is preferable. When ammonia is employed, 1-carboxyl-4-amino-cyclohexene is obtained as the final product after hydrolysis with an inorganic acid.

The amines to be reacted with said 4-halo-4-cyanocyclohexene are primary alkyl amines such as mono-methyl amine, mono-ethyl amine, mono-propyl amine, mono-isopropyl amine, mono-butyl amine, n-amylamine, iso-amylamine, n-hexylamine, n-heptylamine, n-octylamine, n-nonylamine, n-dodecylamine, and the like. These primary alkyl amines can be used preferably in combination with tertiary alkyl amines such as tri-methyl amine, tri-ethyl amine, tri-propyl amine, tri-isopropyl amine, tri-butyl amine, and the like which do not react with said 4-halo-4-cyanocyclohexene.

When primary alkyl amines are used, 1-carboxyl-4-N-alkyl-amino-cyclohexenes are obtained as the final product after hydrolysis with an inorganic acid.

Among the inorganic acids to be used for the hydrolysis of the intermediate reaction product of the 4-halo-4-cyano-cyclohexene and ammonia or a primary amine include hydrochloric acid, hydrobromic acid, sulfuric acid, phosphoric acid, and the like.

The procedure to carry out the present process is as follows. A 4-halo-4-cyano-cyclohexene (I) is mixed with more than a twice-molar amount (preferably 5–40 mols per mol of (I)) of liquid ammonia or an alkyl amine in a closed vessel (in case the boiling point of the alkyl amine used is relatively high, an open vessel may be employed) and maintained at a temperature between 0° C. and 100° C. preferably between 15° C. and 70° C. for 1 to 50 hours preferably 10 to 40 hours, and then the excess ammonia or alkyl amine is removed.

The remaining reaction product is mixed with 5–20 times the amount of concentrated hydrochloric acid and refluxed with heating for a period from 5 to 10 hours, and then the excess hydrochloric acid is distilled off. The residue is a mixture of amino acid hydrochloride and by-produced ammonium chloride or amine hydrochloride. If the residue is purified by using a suitable means, for instance, ion exchange resin, amino acid (II) can be obtained in a high yield of 80 to 90%.

In the present process, the use of considerably large excess amount of primary alkyl amine relative to Compound I can give better results. In such a case, if a tertiary alkyl amine such as tri-ethyl amine is used in addition to the primary amine, the amount of the primary amine can be reduced, and moreover the amino acid (II) can be obtained in the same order or higher yield compared with the case of using a primary alkyl amine alone. In fact, if a 4-halo-4-cyano-cyclohexene and a mixture of more than equi-molar amount (5 to 1 molar excess is sufficient) of a primary alkyl amine and more than equimolar amount (preferably 5–40 times the molar amount) of a tertiary alkyl amine are treated under the similar conditions as above mentioned, 1-carboxyl-4-N-alkyl-amino-cyclohexene can be obtained in a good yield of 80 to 95%.

The following examples are given only for illustrating the present invention and should not be understood to restrict the scope of the present invention.

EXAMPLE 1

14 grams of 4-cyano-4-chloro-cyclohexene were mixed with 60 milliliters of liquid ammonia in a closed vessel and the mixture was maintained at 60°–65° C. for 30 hours. After removing excess ammonia, the remaining reaction product was filtered to separate solids. 100 milliliters of concentrated hydrochloric acid were added to the filtrate and the mixture was refluxed with heating for 7 hours. After distilling off excess hydrochloric acid, the residue was dissolved in 200 milliliters of water, was introduced into a cation exchange resin Amberlite IR–120 which had been preliminarily made H-type, was washed well with water and then was developed with 5% aqueous ammonia. The developed solution was evaporated to dryness and 13 grams of 1-carboxyl-4-aminocyclohexene were obtained as the residue. The yield was 82%. By re-crystallization from a water-acetone mixed solvent, colorless needle crystals having melting point 241°–242° C. were obtained.

Chemical analysis as $C_7H_{11}NO_2(2H_2O)$. Calculated: C, 52.82%; H, 8.18%; N, 8.80%. Analyzed: C, 52.75%; H, 8.19%; N, 8.75%.

Further, the position of double bond in the product was confirmed by means of infra-red absorption spectrum ($C \equiv N$ 2,220 cm.$^{-1}$) on the reaction product

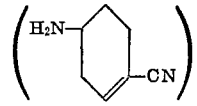

after the first stage ammonia treatment and before the hydrochloric acid treatment. The position of the amino group was confirmed by the fact that if same is hydrolized and hydrogenated, 4-amino-cyclohexyl carboxylic acid

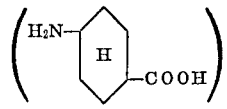

can be obtained.

EXAMPLE 2

14 grams of 4-cyano-4-chloro-cyclohexene and 50 grams of methyl amine were mixed in a closed vessel. After the reaction was effected at 15°–20° C. for 50 hours, excess methyl amine was distilled off. The remaining reaction product was filtered. The filtrate was mixed with 80 milliliters of 50% sulfuric acid and then was refluxed with heating for 4 hours. Then the solution was neutralized with an aqueous solution of barium hydroxide to adjust same to a pH of 7. After removing barium sulfate by filtration, the solution was dryed under a reduced pressure. The residue was re-crystallized from an acetone-water mixed solvent and 13.5 grams of 1-carboxyl-4-N-methylamino-cyclohexene were obtained as colorless needle crystals having a melting point of 229°–230° C. The yield was 81%.

Chemical analysis as $C_8H_{13}NO_2$. Calculated: C, 61.94%; H, 8.39%; N, 9.03%. Analyzed: C, 61.90%; H, 8.40%; N, 9.15%.

The structure was confirmed by a separately conducted synthesis of 4-methylaminocyclohexyl carboxylic acid by reducing p-methylamino benzoic acid.

EXAMPLE 3

14 grams of 4-cyano-4-chloro-cyclohexene, 20 grams of ethylamine and 50 milliliters of toluene were mixed in a closed vessel and the mixture was agitated at 20°–25° C. for 50 hours. After removing the precipitated amine hydrochloride by filtration, excess ethyl amine and toluene were distilled off. The residue was mixed with 180 milliliters of concentrated hydrochloric acid and was refluxed with heating for 7 hours. Then the hydrochloric acid was distilled off and a solid residue was obtained. After that, purification similar to that in Example 1 was followed and 14.5 grams of 1-carboxyl-4-N-ethylamino-cyclohexene were obtained. The yield was 86%. By re-crystallization from a water-acetone mixed solvent, colorless needle crystals having a melting point of 217°–218° C. were obtained.

Chemical analysis as $C_9H_{18}NO_2$. Calculated: C, 63.91%; H, 8.87%; N, 8.28%. Analyzed: C, 64.10%; H, 9.01%; N, 8.23%.

EXAMPLE 4

A mixture of 14 grams of 4-cyano-4-chlorocyclohexene and 50 milliliters of isopropyl amine was agitated at 60°–70° C. for 25 hours in a closed vessel. Then the mixture was left at room temperature to cool and amine hydrochloride was precipitated. After removing the precipitates by filtration, unreacted iso-propylamine was distilled off by distillation. The residue was mixed with 150 milliliters of concentrated hydrochloric acid and was refluxed with heating for 8 hours and then hydrochloric acid was distilled off. The residue obtained as solid was purified in the same way as in Example 1 and 15.3 grams of 1-carboxyl-4-N-iso-propylaminocyclohexene having a melting point of 224°–225° C. were obtained. The yield was 84%.

EXAMPLE 5

A mixture of 14 grams of 4-cyano-4-chlorocyclohexene, 15 grams of n-butyl amine and 40 grams of triethyl amine was agitated at 70° C. for 25 hours. The reaction product was cooled to precipitate amine hydrochloride. After removing the precipitates by filtration, triethyl amine and excess butyl amine were recovered by distillation. The residue was mixed with 150 milliliters of concentrated hydrochloric acid, was refluxed with heating for 8 hours and then hydrochloric acid was distilled off. The residue was purified in the same way as in Example 1 and 16.8 grams of 1-carboxyl-N-n-butylamino-cyclohexene were obtained. The yield was 87%. By recrystallization from a water-ethanol-acetone mixed solvent, colorless needle crystals having a melting point of 208°–209° C. were obtained.

Chemical analysis as $C_{11}H_{19}NO_2$. Calculated: C, 67.01%; H, 9.64%; N, 7.11%. Analyzed: C, 67.07%; H, 9.63%; N, 7.14%.

EXAMPLE 6

9.3 grams of 4-cyano-4-bromo-cyclohexene and 50 milliliters of liquid ammonia were mixed in a closed vessel. After the mixture was maintained at 25°–30° C. for 40 hours, excess ammonia was distilled off. The residue was mixed with 70 milliliters of concentrated hydrochloric acid and was refluxed with heating for 6 hours. After distilling off excess hydrochloric acid, the residue was dissolved in 130 milliliters of water. After that, the same purification as in Example 1 was followed and 7.5 grams of 1-carboxyl-4-aminocyclohexene were obtained. The yield was 85%.

EXAMPLE 7

A mixture of 9.3 grams of 4-cyano-4-bromo-cyclohexene, 3.0 grams of n-butyl amine and 50 milliliters of toluene was agitated at 50°–60° C. for 35 hours. After the mixture was left at room temperature to cool, the precipitated amine hydrobromide was removed by filtration and then excess butyl amine and toluene were distilled off. The residue was mixed with 70 milliliters of concentrated hydrochloric acid, was refluxed with heating for 6 hours and then excess hydrochloric acid was distilled off. The residual solid was purified in the same way as in Example 1 and 8.2 grams of 1-carboxyl-N-n-butyl-amino-cyclohexene were obtained. The yield was 88%.

What is claimed is:

1. Compounds of the formula:

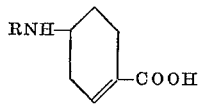

wherein R is a member selected from the group consisting of hydrogen and alkyl groups of up to 20 carbon atoms.

2. 1-carboxyl-4-amino-cyclohexene.
3. 1-carboxyl-4-N-methylamino-cyclohexene.
4. 1-carboxyl-4-N-ethylamino-cyclohexene.
5. 1-carboxyl-4-N-isopropylamino-cyclohexene.
6. 1-carboxyl-4-N-butylamino-cyclohexene.
7. A process for the preparation of compounds of the formula:

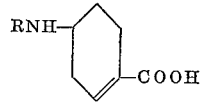

wherein R is selected from the group consisting of hydrogen and alkyl groups of up to 20 carbon atoms, said method comprising reacting a 4-halo-4-cyano-cyclohexene of the formula

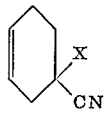

wherein X is selected from the group consisting of chlorine and bromine with more than twice the molar amount of an amine of the formula $R-NH_2$ wherein R is as defined above at a temperature between 0° C. and 100° C. to form a reaction product and hydrolyzing the reaction product with an inorganic acid to form said compound.

8. The process according to claim 7 in which the amine of the formula $R-NH_2$ is ammonia and the compound is 1-carboxyl-4-amino-cyclohexene.

9. The process according to claim 7 in which the amine of the formula $R-NH_2$ is a primary alkyl amine having from 1 to 20 carbon atoms and the compound is a 1-carboxyl-4-N-alkylaminocyclohexene.

10. The process according to claim 7 in which a tertiary alkylamine is used in addition to the amine of the formula $R-NH_2$.

References Cited

U. Prelog and U. Geyer: Helv. Chim. Acta 28 (1684–1692) (1945).

LORRAINE A. WEINBERGER, *Primary Examiner.*

PAUL JOHN KILLOS, *Assistant Examiner.*

U.S. Cl. X.R.

260—78, 464